(12) United States Patent
Kotliar

(10) Patent No.: US 8,763,712 B2
(45) Date of Patent: Jul. 1, 2014

(54) HYPOXIC AIRCRAFT FIRE PREVENTION SYSTEM WITH ADVANCED HYPOXIC GENERATOR

(75) Inventor: Igor K. Kotliar, New York, NY (US)

(73) Assignee: Firepass Corporation, New York, NY (US)

(*) Notice: Subject to any disclaimer, the term of this patent is extended or adjusted under 35 U.S.C. 154(b) by 96 days.

(21) Appl. No.: 13/420,315

(22) Filed: Mar. 14, 2012

(65) Prior Publication Data

US 2012/0222873 A1 Sep. 6, 2012

Related U.S. Application Data

(63) Continuation-in-part of application No. 11/183,948, filed on Jul. 19, 2005, now Pat. No. 8,141,649, and a continuation-in-part of application No. 12/079,224, filed on Mar. 24, 2008, now abandoned.

(51) Int. Cl.
*A62C 2/00* (2006.01)

(52) U.S. Cl.
USPC ............... 169/45; 169/37; 169/46; 169/61; 169/62; 244/129.2; 96/134; 95/96

(58) Field of Classification Search
USPC .............. 169/37, 45, 46, 54, 56, 61, 62; 244/129.2, 135 R; 96/134; 95/96, 130
See application file for complete search history.

(56) References Cited

U.S. PATENT DOCUMENTS

| | | |
|---|---|---|
| 3,893,514 A | 7/1975 | Carhart et al. |
| 3,948,626 A | 4/1976 | Bragg |
| 4,378,920 A | 4/1983 | Runnels et al. |
| 4,556,180 A | 12/1985 | Manatt |
| 4,681,602 A | 7/1987 | Glenn et al. |
| 4,807,706 A | 2/1989 | Lambertsen et al. |
| 4,896,514 A | 1/1990 | Sugiyama et al. |
| 5,063,753 A | 11/1991 | Woodruff |
| 5,220,799 A | 6/1993 | Lievens et al. |
| 5,273,344 A | 12/1993 | Volkwein et al. |
| 5,308,382 A | 5/1994 | Prasad |
| 5,388,413 A | 2/1995 | Major et al. |
| 5,472,480 A | 12/1995 | Barbe |
| 5,649,995 A | 7/1997 | Gast, Jr. |
| 5,730,780 A | 3/1998 | Booth, III |

(Continued)

FOREIGN PATENT DOCUMENTS

| | | |
|---|---|---|
| EP | 1 062 005 B1 | 9/1999 |
| WO | WO 96/37176 | 11/1996 |

OTHER PUBLICATIONS

"A Benefit Analysis for Nitrogen Inerting of Aircraft Fuel Tanks Against Ground Fire Explosion", Final Report, DOT/FAA/AR-99/73 Office of Aviation Research, NTIS, Springfield, VA 617 Kb, 117 pages (Dec. 1999).

(Continued)

*Primary Examiner* — Steven J Ganey (74) *Attorney, Agent, or Firm* — Orrick, Herrington & Sutcliffe, LLP (57) ABSTRACT

An aircraft fire prevention system provides oxygen depleted (hypoxic) air for the fuel tank and/or cargo compartment protection; the system does not employ compressed air for the production of hypoxic air, which allows to save energy and fuel and to reduce negative impact on the earth atmosphere.

20 Claims, 2 Drawing Sheets

(56) References Cited

U.S. PATENT DOCUMENTS

| | | | |
|---|---|---|---|
| 5,799,495 A | 9/1998 | Gast, Jr. et al. | |
| 5,799,652 A | 9/1998 | Kotliar | |
| 5,887,439 A | 3/1999 | Kotliar | |
| 5,921,091 A | 7/1999 | Foss et al. | |
| 6,012,533 A | 1/2000 | Cramer | |
| 6,112,822 A | 9/2000 | Robin et al. | |
| 6,314,754 B1 | 11/2001 | Kotliar | |
| 6,334,315 B1 | 1/2002 | Kotliar | |
| 6,418,752 B2 | 7/2002 | Kotliar | |
| 6,547,188 B2 | 4/2003 | Schmutz et al. | |
| 6,604,558 B2 | 8/2003 | Sauer | |
| 6,634,598 B2 | 10/2003 | Susko | |
| 6,729,359 B2 | 5/2004 | Jones | |
| 6,739,400 B2 | 5/2004 | Lessi et al. | |
| 6,997,970 B2 * | 2/2006 | Crome | 96/134 |
| 7,152,635 B2 | 12/2006 | Moravec et al. | |
| 2005/0173017 A1 | 8/2005 | Moravec et al. | |

OTHER PUBLICATIONS

"A Review of the Flammability Hazard of Jet A Fuel Vapor in Civil Transport Aircraft Tanks", Final Report, DOT/FAA/AR-98/26, 1.04 Mb, 62 pages, FAA White Papers (Jun. 1998).
AFWAL-TR-85-2060, Vulnerability Methodology and Protective Measures for Aircraft Fire and Explosion Hazards, vol. I, 41 pgs. (Jan. 1986).
AFWAL-TR-85-2060, Vulnerability Methodology and Protective Measures for Aircraft Fire and Explosion Hazards, vol. II, Part I, 139 pgs. (Jan. 1986).
AFWAL-TR-85-2060, Vulnerability Methodology and Protective Measures for Aircraft Fire and Explosion Hazards, vol. III (Part I, Part II, Part III), 429 pgs. (Jan. 1986).
Airbus Americas Inc., Defendants' Opening Claim Construction Brief, 30 pgs, (Feb. 1, 2011).
Airbus Americas Inc., Defendants' Opposition Claim Construction Brief, 30 pgs. (Mar. 18, 2011).
Airbus Americas Inc., Defendants' Supplemental Opening Brief, Airbus Americas Opposition Claim Construction Brief, 16 pgs. (Mar. 1, 2011).
Aircraft Accident Report, "In-Flight Breakup Over the Atlantic Ocean Trans World Airlines Flight 800", National Transportation Safety Board, NTSB/AAR-00/03 7.63 Mb, 341 pages (Jul. 17, 1996).
Anderson, C.L., "Test and Evaluation of Halon 1301 and Nitrogen Inerting Against 23MM HEI Projectiles", Technical Report AFFDL-TR-78-66, Air Force Flight Dynamics Laboratory, Wright-Patterson Air Force Base, OH, 52 pages (May 1978).
Aviation Rulemaking Advisory Committee, "Fuel Tank Inerting", Fuel Tank Harmonization Working Group, Task Group 3, Final Report, (Jun. 28, 1998).
Bower, D.R., "Flight Test Group Chairman's Factual Report of Investigation", NTSB/SA-516, 96 Kb, 24 pages, FAA White Papers (Jul. 17, 1996).
Burns, M. et al., "Inerting of a Vented Aircraft Fuel Tank Test Article With Nitrogen Enriched Air", Federal Aviation Administration, FAA William J. Hughes Technical Center, Airport and Aircraft Safety, Research and Development Division, Atlantic City Int'l. Airport, NJ, 2.28 Mb, 29 pages, FAA White Papers (Apr. 2001).
Burns, M. et al., "Ground and Flight Testing of a Boeing 737 Center Wing Fuel Tank Inerted With Nitrogen-Enriched Air" Federal Aviation Administration, William J. Hughes Technical Center, Airport and Aircraft Safety, Research and Development Division, Atlantic City Int'l Airport, NJ 08405, DOT/FAA/AR-01/63, 4.91 Mb, 34 pages, FAA White Papers (Aug. 2001).
Cavage, W.M., "The Cost of Implementing Ground-Based Fuel Tank Inerting in the Commercial Fleet", Airport and Aircraft Safety, Research and Development Division, FAA William J. Hughes Technical Center, Atlantic City International Airport, NJ, DOT/FAA/AR-00/19, 941 Kb, 60 pages, FAA White Papers (May 2000).
Cavage, W.M., "Ground-Based Inerting of a Boeing 737 Center Wing Fuel Tank", FAA, AAR-422, Fire Safety R&D, Copyright @ 2001 Society of Automotive Engineers, Inc., SAE-GBI, 281 Kb, 8 pages, FAA White Papers.
Cavage, W.M. et al., "Modeling In-flight Inert Gas Distribution in a 747 Center Wing Fuel Tank", Federal Aviation Administration, Atlantic City, NJ, Boeing Phantom Works, St. Louis, MO, AIAAFDC32143b.pdf, 598 Kb, 13 pages, FAA White Papers.
Cavage, W.M., "Ground-Based Inerting of Commercial Transport Aircraft Fuel Tanks", Fire Safety Branch, Federal Aviation Administration, AAR-422, Building 204, William J. Hughes Technical Center, Atlantic City International Airport, NJ, RTO__AVT-GBI Paper 761 Kb, 20 pages, FAA White Papers.
Cavage, W.M, "Modeling of In-flight Fuel Tank Inerting for FAA OBIGGS Research", Fire Safety Branch, Federal Aviation Administration, William J. Hughes Technical Center, Atlantic City International Airport, NJ, 255 Kb, 11 pages, FAA White Powers.
Cavage, W.M., "Modeling Inert Gas Distribution in Commercial Transport Aircraft Fuel Tanks", Fire Safety Section, Federal Aviation Administration, Atlantic City International Airport, NJ, AIAA Paper 2002-3032, Report 1300, 600 Kb, 8 pages, FAA White Papers.
Cavage, W.M. et al., "Development and Testing of the FAA Simplified Fuel Tank Inerting System", Fire Safety Branch, Federal Aviation Administration, William J. Hughes Technical Center, Atlantic City Int'l Airport, NJ, Cavage-FAAOBIGGSDevelop&Test, 530 Kb, 11 pages, FAA White Papers.
Defendant's Answer, Affirmative Defenses and Counterclaims, *Firepass IP Holdings, Inc.* and *Firepass Corporation*, v. *The Boeing Company*, CV-08-01766 E.D.N.Y. 12 pages (Jun. 20, 2008).
Desmarais, L.A. et al., "Integrated Aircraft Fuel Tank Inerting and Compartment Fire Suppression System", Boeing Military Airplane Co. AFWAL-TR-83-2021, vol. II [Exh 20—pp. 4985-5227], 243 pgs (Apr. 1983).
Evans, D., "Safety v. Entertainment", Avionics Magazine (Feb. 1, 2003).
FirePass IP Holdings Inc., Plaintiff's First Supplemental Preliminary Infringement Contentions, 63 pgs (Nov. 12, 2010).
FirePass IP Holdings Inc., Plaintiff's Opening Claim Construction Brief, 51 pgs (Feb. 1, 2011).
FirePass IP Holdings Inc., Plaintiff's Rebuttal Claim Construction Brief, 31 pgs (Mar. 18, 2010).
Graves, C.C. et al., "Basic Considerations in the Combustion of Hydrocarbon Fuels with Air", FAA-Propulsion Chemistry Division, NACA-1300, 24.04 Mb 26, 268 pages, FAA White Papers.
Gustafsson, C. et al., "Effects Normobaric Hypoxic Confinement on Visual and Motor Confinement, Aviation", Space and Environmental Medicine, vol. 68 No. 11, 8 pgs (Nov. 1997).
Hashem, P., "Hamilton Sundstrand and Two Units of Cobham to Supply Nitrogen Generation System for Boeing 7E7", Hamilton Sundstrand, a United Technologies Company, Windsor Locks, Conn., Corporate Press Release (Jul. 1, 2004).
Hochachka, P.W., "Mechanism and Evolution of Hypoxia-Tolerance in Humans", The Journal of Experimental Biology 201, 1243-1254 (Mar. 24, 1998).
Knight, D.R., "The Medical Hazards of Flame Suppressant Atmospheres", NWMRL Report 1167, 24 pgs (Apr. 19, 1991).
Knight, T.C. et al., "The AH-64A Nitrogen Inerting System", Hughes Helicopters, Inc., Culver City, CA (Oct. 31-Nov. 2, 1984).
Kuchta, J.M., "Oxygen Dilution Requirements for Inerting Aircraft Fuel Tanks," Bureau of Mines, U.S. Dept. of Interior, Second Conference on Fuel System Fire Safety, 21 pgs (May 6-7, 1970).
Levin, A., "FAA Device Could Guard Against Terrorism; Experts: Fuel-tank System Could Help Jets Survive Missile Attack" (McLean Va: p. A.03) Final Edition, Copyright 2003 Gannett Company, Inc., USA Today (Feb. 18, 2004).
Levin, A., "FAA Suggests Airbus Modify Jets to Reduce Risks; Fuel Tanks Scrutinized", (McLean VA: p. B.03), Final Edition, Copyright 2003 Gannett Company, Inc., USA Today (Nov. 19, 2003).
Levin, A., "Jets Must Be Altered, Device Created to Stop Fuel-Tank Explosions", (McLean VA: p. A.01), Final Edition, Copyright 2004 Gannett Company, Inc., USA Today (Feb. 17, 2004).

(56) References Cited

OTHER PUBLICATIONS

Levin, A., "Lower cost, higher risk helped alter FAA stance", (McLean, VA: p. A.03), Copyright 2004 Gannett Company, Inc., USA Today (Feb. 17, 2004).
Manatt, S.A., "Hollow Fiber Permeable Membrane for Airborne Inert Gas Generation", Society of Automotive Engineers, SAE Paper No. 740854, 11 pgs (Oct. 1-3, 1974).
Ott, E.E. et al., "Influence of Fuel Slosh Upon the Effectiveness of Nitrogen Inerting for Aircraft Fuel Tanks," Technical Report AFAPL-TR-70-82, 32 pgs. (Feb. 1971).
Peacock, A.J., "Oxygen at High Altitude", BMJ 1998; 317:1063-1066 (Oct. 17, 1998).
Reynolds, T.L. et al., "Onboard Inert Gas Generation System/Onboard Oxygen Gas Generation System", Boeing Commercial Airplanes Group, Seattle, Wash., (OBIGGS/OBOGS) Study NASA/CR-2001-210903 7.75 Mb, 179 pages, FAA White Papers (May 2001).
Stewart, P.B. et al., "Inerting Conditions for Aircraft Fuel Tanks", WADE Technical Report 55-418, Defense Technical Information Center, Defense Logistics Agency, Alexandria, VA (Oct. 31-Nov. 2, 1984).
Summer, S.M., "Cold Ambient Temperature Effects on Heated Fuel Tank Vapor Concentrations", DOT/FAA/AR-TN99-93, 395 Kb, 13 pages, FAA White Papers (Jul. 2000).
Summer, S.M., Limiting Oxygen Concentration Required to Inert Jet Fuel Vapors Existing at Reduced Fuel Tank Pressures, DOT/FAA/AR-TN02/79, 1.78 Mb, 32 pages, FAA White Papers (Aug. 2003).
Summer, S.M., "Mass Loading Effects on Fuel Vapor Concentrations in an Aircraft Fuel Tank Ullage", DOT/FAA/AR-TN99/65, 934 Kb, 14 pages, (Sep. 1999).
Thomas, I., "FAA R&D Efforts on Flammability", 2.3 Mb, 27 pages, FAA White Papers, (Aug. 14, 2002).
Tyson, J.H., et al. "The Effectiveness of Ullage Nitrogen-Inerting Systems Against 30-mm High-Explosive Incendiary Projectiles", Naval Weapons Center, China Lake, CA, Final Report JTCG/AS-90-T-004, pp. 3-4, 24-32 (155 pages) (May 1991).
Vannice, W.L. et al., "Fighter Aircraft OBIGGS Study", Air Force Wright Aeronautical Laboratories, Wright-Patterson AFB, Dayton, OH 45433-6563, vol. 1, (Jun. 1987).
Zinn, S.V. et al., "Inerted Fuel Tank Oxygen Concentration Requirements," Interim Report, Nat'l Aviation Facilities Experimental Center, Atlantic City, NJ, FAA-RD-71-42, 23 pages, FAA White Papers (Aug. 1971).

* cited by examiner

HYPOXIC AIRCRAFT FIRE PREVENTION SYSTEM WITH ADVANCED HYPOXIC GENERATOR

The present application is a continuation-in-part of U.S. patent application Ser. No. 11/183,948 titled "Hypoxic Fire Suppression System for Aerospace Applications" filed Jul. 19, 2005 and issued Mar. 27, 2012, as U.S. Pat. No. 8,141,649, and U.S. patent application Ser. No. 12/079,224 titled "Method of Producing Hypoxic Environments in Enclosed Compartments Employing Fuel Cell Technology" filed Mar. 24, 2008 (now abandoned), both of which are continuations-in-part of U.S. application Ser. No. 10/726,737, filed Dec. 3, 2003, titled "Hypoxic Aircraft Fire Prevention and Suppression System with Automatic Emergency Oxygen Delivery System" filed Dec. 3, 2003 and issued Mar. 8, 2011, as U.S. Pat. No. 7,900,709, which is a continuation-in-part of U.S. application Ser. No. 09/854,108, filed May 11, 2001, now U.S. Pat. No. 6,401,487, and a continuation-in-part of U.S. application Ser. No. 09/975,215, filed on Oct. 10, 2001, now U.S. Pat. No. 6,502,421, and a continuation-in-part of U.S. application Ser. No. 09/750,801, filed on Dec. 28, 2000, now U.S. Pat. No. 6,418,752, and claims benefit of and priority to U.S. Provisional Application Ser. No. 60/461,450 filed Apr. 9, 2003. U.S. patent application Ser. No. 11/183,948 also is a continuation-in-part of U.S. application Ser. No. 09/551,026, filed on Apr. 17, 2000, now U.S. Pat. No. 6,314,754, and a continuation-in-part of U.S. application Ser. No. 09/566,506, filed on May 8, 2000, now U.S. Pat. No. 6,334,315, and a continuation-in-part of U.S. application Ser. No. 09/854,108, filed May 11, 2001, now U.S. Pat. No. 6,401,487, and a continuation-in-part of U.S. application Ser. No. 09/750,801, filed on Dec. 28, 2000, now U.S. Pat. No. 6,418,752, and a continuation-in-part of U.S. application Ser. No. 09/975,215, filed on Oct. 10, 2001, now U.S. Pat. No 6,502,421, and a continuation-in-part of U.S. application Ser. No. 10/078,988, filed on Feb. 19, 2002, now U.S. Pat. No. 6,557,374, and a continuation-in-part of U.S. application Ser. No 10/024,079, filed on Dec. 17, 2001, now U.S Pat. No. 6,560,991. U.S. application Ser. No. 09/566,506 is a continuation-in-part of U.S. application Ser. No. 09/551,026, filed on Apr. 17, 2000, now U.S. Pat. No. 6,314,754. U.S. application Ser. No. 10/078,988 is a continuation-in-part of U.S. application Ser. No. 10/024,079, filed on Dec. 17, 2001 now U.S. Pat. No. 6,560,991, and a continuation-in-part of U.S. application Ser. No. 09/975,215, filed on Oct. 10, 2001 now U.S. Pat. No. 6,502,421, and a continuation-in-part of U.S. application Ser. No. 09/854,108, filed on May 11, 2001, now U.S. Pat. No. 6,401,487, and a continuation-in-part of U.S. application Ser. No. 09/750,801, filed on Dec. 28, 2000 now U.S. Pat. No. 6,418,752, and a U.S. application Ser. No. 10/024,079 is a continuation-in-part of U.S. application Ser. No. 09/750,801, filed on Dec. 28, 2000 now U.S. Pat. No. 6,418,752, and a continuation-in-part of U.S application Ser. No. 09/854,108, filed on May 11, 2001, now U.S. Pat. No. 6,401,487, and a continuation-in-part of U.S. application Ser. No. 09/975,215, filed on Oct. 10, 2001, now U.S. Pat. No. 6,502,421. U.S. application Ser. No. 09/975,215 is a continuation-in-part of U.S. application Ser. No. 09/750,801, filed on Dec. 28, 2000, now U.S. Pat. No. 6,418,752, and a continuation-in-part of U.S. application Ser. No. 09/854,108, filed on May 11, 2001, now U.S. Pat. No. 6,401,487. U.S. application Ser. No. 09/854,108 is a continuation-in-part of U.S. application Ser. No. 09/705,801, filed on Dec. 28, 2000. now U.S. Pat. No. 6,418,752, and a continuation-in-part of U.S. application Ser. No. 09/566,506, filed on May 8, 2000, now U.S. Pat. No. 6,334,315, and a continuation-in-part of U.S. application Ser. No. 09/551,026, filed on Apr. 17, 2000, now U.S. Pat. No. 6,314,754. U.S. application Ser. No. 09/750,801 is a continuation-in-part of U.S. application Ser. No. 09/551,026, filed on Apr. 17, 2000, now U.S. Pat. No. 6,314,754. U.S. patent application Ser. Nos. 11/183,948 and 12/079,224, U.S. Pat. No. 7,900,709, and U.S. Provisional Application Ser. No. 60/461,450 are incorporated by reference herein in their entirety for all purposes.

FIELD

The present invention relates to a method, equipment, and composition of Hypoxic Aircraft Fire Prevention System (HAFPS) that utilizes Hypoxic Air Venting (HAV) to provide fire protection (inerting) of fuel tanks and to provide fire-preventive environment in a cargo compartment.

With its mode of action based on the automatic release of hypoxic air, this system is completely non-toxic, simple and reliable. Consequently, it is ideally suited to provide fire protection for any aircraft or airspace vehicle.

BACKGROUND

Solutions to the challenge of fire safety are discussed in U.S. Pat. No. 7,900,709, and U.S. patent application Ser. Nos. 11/183,948 and 12/079,224 (all of which are incorporated herein by reference in their entirety). U.S. Pat. No. 7,900,709, and U.S. patent application Ser. No. 11/183,948 and U.S. Ser. No. 12/079,224 describe establishing a hypoxic fire-preventive environment in different compartments of an aircraft during its operation.

The concept of inerting aircraft fuel tanks with hypoxic air up to 12% oxygen content has been adopted by the aviation community. The FAA (Federal Aviation Administration) requires installation of such systems for fuel tank protection on all commercial airplanes, which illustrates a practical implementation of the solutions provided in the patent and applications disclosed above.

However, all currently proposed systems require compressed air for feeding of an air separation device that produces hypoxic air for inerting of the fuel tanks. This requires energy and additional fuel has to get burned on the aircraft, which cost money and provides a negative impact on the Earth's atmosphere.

SUMMARY

The principal objects of the present invention are as follows:

The provision of an aircraft fire prevention and suppression system that overcomes the above-described deficiencies in the prior art.

The provision of an onboard system that allows to constantly generating hypoxic air in an air separation device utilizing the pressure difference between an internal compartment of an aircraft (cabin) and fuel tank and cabin and external atmosphere.

The provision of a membrane based air separation device utilizing the pressure difference between an internal compartment of an aircraft and external atmosphere and said internal compartment and a fuel tank.

The provision of a PSA or VPSA based air separation device utilizing the pressure difference between an internal compartment of an aircraft, fuel tank and external atmosphere.

The provision of a fuel cell based air separation device utilizing the pressure differences between an internal compartment of an aircraft and a fuel tank and internal compartment and external atmosphere.

According to one embodiment, a system for providing fire prevention for a fuel tank on an aircraft by using cabin air for producing oxygen-depleted (hypoxic) air from the cabin air comprises an air-separation device having an inlet and first and second outlets; said air-separation device employing a first pressure difference between said inlet and said first outlet, and a second pressure difference between said inlet and said second outlet; said first pressure difference and said second pressure difference providing a driving force for separating said cabin air into oxygen-enriched and oxygen-depleted gas mixtures without preliminary compression; said inlet communicating with an interior atmosphere of the aircraft, said first outlet communicating with a fuel tank, and said second outlet communicating with the atmosphere outside of the said aircraft; said inlet receiving said cabin air and said first outlet transmitting an oxygen-reduced gas mixture and said second outlet transmitting an oxygen-enriched gas mixture; said oxygen-enriched gas mixture being normally vented outside the aircraft; and said oxygen-reduced gas mixture, when in use, being supplied into said fuel tank for maintaining therein a hypoxic environment in order to prevent fuel ignition or explosion; wherein an oxygen content in said oxygen-reduced gas mixture is maintained in a range from 9% to 15% and, preferably, below 12% and above 10%.

According to a further embodiment, said oxygen-reduced gas mixture, when in use, is constantly supplied into said fuel tank for maintaining therein a hypoxic environment in order to prevent fuel ignition or explosion.

According to a further embodiment, said air separation device employing a hollow fiber air separation membrane.

According to a further embodiment, said air separation device employing one of fuel cell technology, a PSA technology, or a VPSA technology.

According to a further embodiment, said air separation device employing a combination of membrane and one of VPSA technology or PSA technology.

According to a further embodiment, said inlet of the air separation device being provided with a compressed air when the aircraft is on the ground or at an altitude below 3 km above sea level, in order to provide continuous fire protection.

According to a further embodiment, said first outlet being provided with a vacuum pump.

According to a further embodiment, said first outlet communicating with a compartment onboard of the aircraft for providing fire protection.

According to a further embodiment, said inlet being provided with an additional fan for oxygen content regulation.

According to a further embodiment, the system further comprises an oxygen content monitoring system provided for measuring the oxygen content of the oxygen-reduced gas mixture transmitted via said first outlet; and a computerized control panel for receiving and analyzing data from said oxygen content monitoring system.

According to one embodiment, a method for providing fire prevention for a fuel tank on an aircraft by using cabin air for producing oxygen-depleted (hypoxic) air from said cabin air comprises employing a first pressure difference, by an air-separation device having an inlet and first and second outlets, between said inlet and said first outlet, employing a second pressure difference by the air-separation device between said inlet and said second outlet; receiving said cabin air by said inlet; separating said cabin air, by using said first pressure difference and said second pressure difference as a driving force, without preliminary compression, into oxygen-enriched and oxygen-depleted gas mixtures; said inlet communicating with an interior atmosphere of the aircraft, said first outlet communicating with a fuel tank, and said second outlet communicating with the atmosphere outside of the said aircraft; transmitting by said first outlet an oxygen-reduced gas mixture; and transmitting by said second outlet an oxygen-enriched gas mixture; said oxygen-enriched gas mixture being normally vented outside the aircraft; said oxygen-reduced gas mixture, when in use, being supplied into said fuel tank for maintaining there a hypoxic environment in order to prevent fuel ignition or explosion; wherein the oxygen content in said oxygen-reduced gas mixture is maintained in the range from 9% to 15% and, preferably, below 12% and above 10%.

According to one embodiment, an apparatus for producing hypoxic air comprises an air-separation device having an inlet and first and second outlets; said air-separation device employing a first pressure difference between said inlet and said first outlet, and a second pressure difference between said inlet and said second outlet; said first pressure difference and said second pressure difference providing a driving force for separating said cabin air into oxygen-enriched and oxygen-depleted gas mixtures without preliminary compression; said inlet communicating with an interior atmosphere of the aircraft, said first outlet communicating with a fuel tank, and said second outlet communicating with the atmosphere outside of the said aircraft; said inlet receiving said cabin air and said first outlet transmitting an oxygen-reduced gas mixture and said second outlet transmitting an oxygen-enriched gas mixture; said oxygen-enriched gas mixture being normally vented outside the aircraft; and said oxygen-reduced gas mixture, when in use, being constantly supplied into said fuel tank for maintaining therein a hypoxic environment in order to prevent fuel ignition or explosion; wherein an oxygen content in said oxygen-reduced gas mixture is maintained in a range from 9% to 15% and, preferably, below 12% and above 10%.

According to one embodiment, a method of producing hypoxic air for fuel tank fire prevention on an aircraft comprises extracting, by an air separation device according to an embodiment described herein, hypoxic air out of air contained in an interior compartment of an aircraft without preliminary pressurization of the air; supplying said hypoxic air into said fuel tank and creating there a fire preventative atmosphere; and expelling an oxygen-enriched fraction of the air as a byproduct of the air separation into an atmosphere outside of said aircraft.

According to a further embodiment, a vacuum pump is provided at said first outlet for improved performance and oxygen content regulation.

According to a further embodiment, an additional fan is provided on said inlet for improving performance of the system and oxygen content regulation.

According to a further embodiment, during a flight at altitudes above 3 km above sea level, said inlet receiving cabin air without preliminary pressurization and separating it into oxygen enriched fraction and oxygen reduced fraction; said oxygen reduced fraction being provided into said fuel tank, via said first outlet, for fire prevention and said oxygen enriched fraction being expelled into atmosphere outside of said aircraft, via said second outlet; said inlet having upstream a valve that switches from a non-pressurized cabin air supply to a pressurized air supply; a compressor that can supply said air separation device, via said valve, with compressed air when aircraft is on the ground or at an altitude below 3 km above sea level; said valve closing compressed air supply when aircraft reaches an altitude high enough to provide air separation using pressure difference between cabin air and outside atmosphere and using suction provided by the fuel consumption in said fuel tank.

According to one embodiment, a method of producing hypoxic air for fuel tank or cargo compartment fire prevention on an aircraft comprises extracting, by an oxygen-consuming device according to an embodiment described herein, some oxygen out of air contained in an interior compartment of an aircraft without preliminary pressurization of the air and expelling some of byproducts of said oxygen consummation into an atmosphere outside of said aircraft; supplying remaining hypoxic air into said fuel tank and creating there a fire preventative atmosphere.

According to various embodiments, said cabin air can be partially supported or replaced by bleed air available on some types of aircraft.

BRIEF DESCRIPTION

DETAILED DESCRIPTION

The present disclosure includes a reliable and low-cost solution that allows for the design and building of fire safe aircraft and is particularly valuable by allowing converting most of existing passenger airplanes into a fire-protected aircraft. The present invention allows this without spending energy and fuel on generating hypoxic air needed for fire prevention.

The present invention overcomes limitations of currently proposed systems due to the fact that it does not require compressed air for the air separation process.

Current airplanes fly most of the time on high altitudes, still providing low-altitude atmospheric pressure inside its compartments, mostly for the passengers' comfort and safety. The present invention is based on the use of the Hypoxic Air Generator principle described in the previous line of the patents provided above and incorporated herein by reference. It is also based on the fact that an air separation unit, required for hypoxic air generation, needs some pressure difference on its inlet and outlets.

The previous line of the patents describes in detail how to utilize compressed ambient air, ether from bleed, received though the inlet of such a unit, for generation of hypoxic air on first outlet and oxygen enriched air on the second outlet. Such an air separation unit is being called in the aviation industry IGGS (Inert Gas Generation System), which is scientifically not correct. Almost all living organisms can perfectly utilize hypoxic air with 12% oxygen in it. Therefore, the term "inert" is not correct. A term "hypoxic" is more appropriate.

However, generation of the compressed air for the air separation costs energy, which requires more fuel to be burned. The present invention proposes the use of an Air Separation unit that works without a compressor. The present invention particularly applies to providing a fire preventative atmosphere in aircraft fuel tanks and, with some modification, for cargo and other compartments of an aircraft.

The main principle of the present invention is to utilize a lower atmospheric pressure outside of the aircraft as a driving force on the permeate side of the air separation unit, along with the suction created in the fuel tank, when the aircraft consumes fuel during the flight, on the retentate side.

For example, if the air separation unit (hypoxic generator) utilizes a hollow fiber membrane, then an oxygen enriched fraction results on the first (permeate) outlet, which communicates with the outside atmosphere, and an oxygen reduced fraction results on the second (retentate) outlet communicating with the fuel tank interior. The same applies to other hypoxic generators that may use PSA (Pressure Swing Adsorption) and other air separation techniques, some of them having also an oxygen enriched retentate and oxygen-depleted permeate.

When an aircraft, after its cabin (interior compartment of an aircraft) is pressurized, climbs to a higher altitude, the difference in atmospheric pressures inside and outside of the aircraft force the cabin air through an air separation device expelling its oxygen-enriched fraction into the outside atmosphere. At the same time the fuel level in a fuel tank gradually decreases providing some suction on the oxygen-reduced (hypoxic) side of the air separation unit (hypoxic generator).

Figure 1:
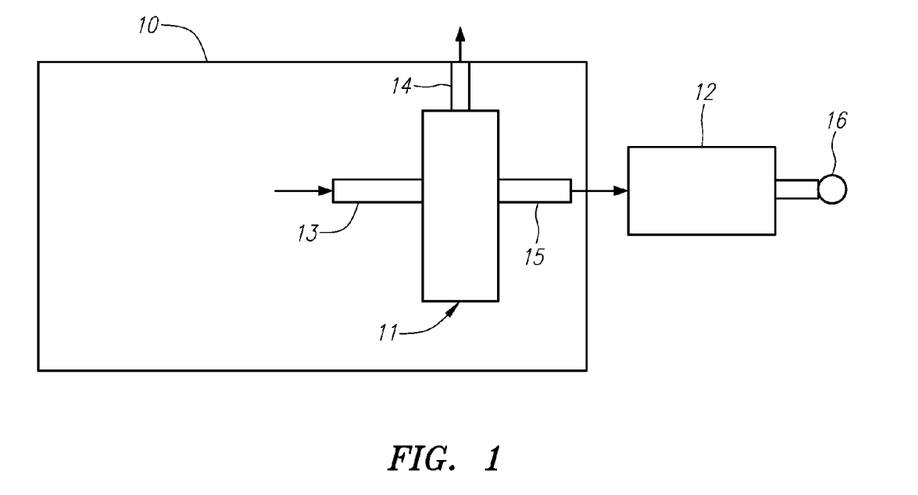
FIG. 1 illustrates a schematic view of the present fire prevention system for a fuel tank protection integrated into a compartment on an aircraft, according to one embodiment.

FIG. 1 illustrates a schematic view of the present system provided for fuel tank fire prevention on an aircraft, according to one embodiment. An interior cabin 10 accommodates a hypoxic generator unit 11 that communicates with a fuel tank 12 via an hypoxic outlet 15. Cabin air is drawn into the hypoxic generator unit 11 via inlet 13 due to the suction on an outlet 14 communicating with the outside atmosphere and suction created in the fuel tank 12 when fuel level decreases. A vacuum pump (not shown here) may be installed before fuel tank 12 on the outlet 15 in order to draw hypoxic air when the fuel from this tank is not consumed and/or for improving performance of the system and/or for oxygen content regulation. In an additional outlet 16 is necessary from the fuel tank 12 in order to release some internal atmosphere out of the tank 12 into the outside atmosphere. The same outlet 16 can be employed as a dive valve that opens when the aircraft loses altitude in order to equalize pressure and prevent damage of the fuel tank 12. The system can be adjusted such that it can provide, via outlet 15, hypoxic air with oxygen content in the range above 9% and below 18% and in particular, from 12% to 15% of oxygen by volume. In some cases, oxygen concentrations from 10% to 12% are most preferred.

Hypoxic generator 11 unit may accommodate an air separation device described above or an oxygen consuming device, such as a rebuilt fuel cell, etc. In this case the outlet 14 can be used for removal of byproducts of the oxygen consummation.

Figure 2:
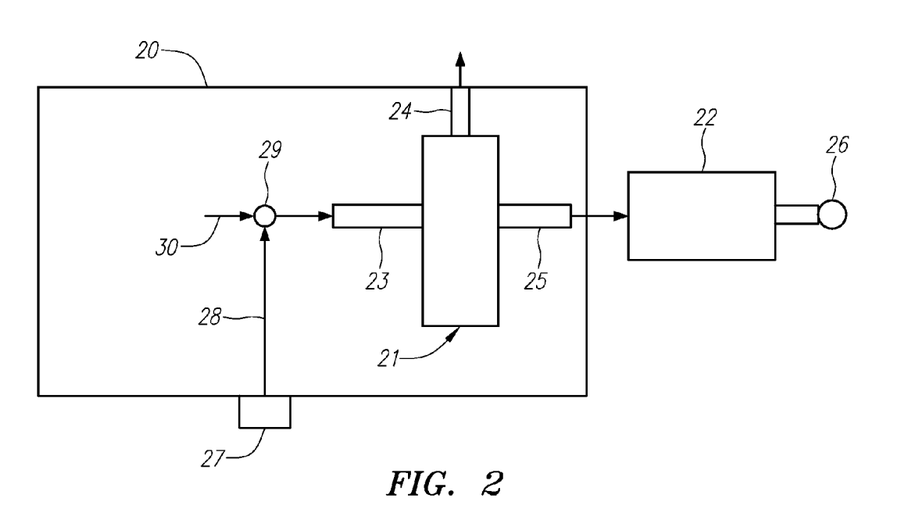
FIG. 2 illustrates a further improved embodiment of the present system for the fuel tank allowing fire protection during all positions of an aircraft, according to one embodiment.

FIG. 2 illustrates a further improved embodiment of the present system that provides a hypoxic fire prevention atmosphere inside of the fuel tank at all times, even on the ground and during flight on lower altitudes (mainly below 2.7 km above sea level). The further embodiment includes similar components: a cabin 20, an air separation unit or hypoxic generator 21 having outlets 24 and 25, an inlet 23, a fuel tank 22 with an outside (dive) valve 26. The difference between the further embodiment and the embodiment depicted in FIG. 1, is that the further embodiment includes a three way valve 29 that allows an input of compressed air from a compressor (or bleed air from the aircraft engine) 27, via conduit 28. This is utilized when the aircraft is on the ground or at lower altitudes (mainly below 3 km above sea level) where no driving force would be applied from the pressure difference between the inlet 23 and outlet 24 and/or 25.

When aircraft cruises at a high altitude, the 3-way valve 29 closes the conduit 28 and opens the inlet 30, which allows cabin air to enter the hypoxic generator 21. This configuration saves fuel that otherwise would be burned to provide compressed air during the entire duration of the flight. As an example, this saving would apply to at least 7 hours during 8 hours of a trans-Atlantic flight.

The inlets 13 and 30 can be equipped with a small capacity fan or blower having low energy consumption, which can improve performance of the air separation unit (IGGS) and/or can be used for oxygen content regulation.

The same configuration can be applied to an aircraft cargo compartment instead of the fuel tank 12 and 22, using a vacuum pump on hypoxic outlet 15 or 25.

Figure 3:
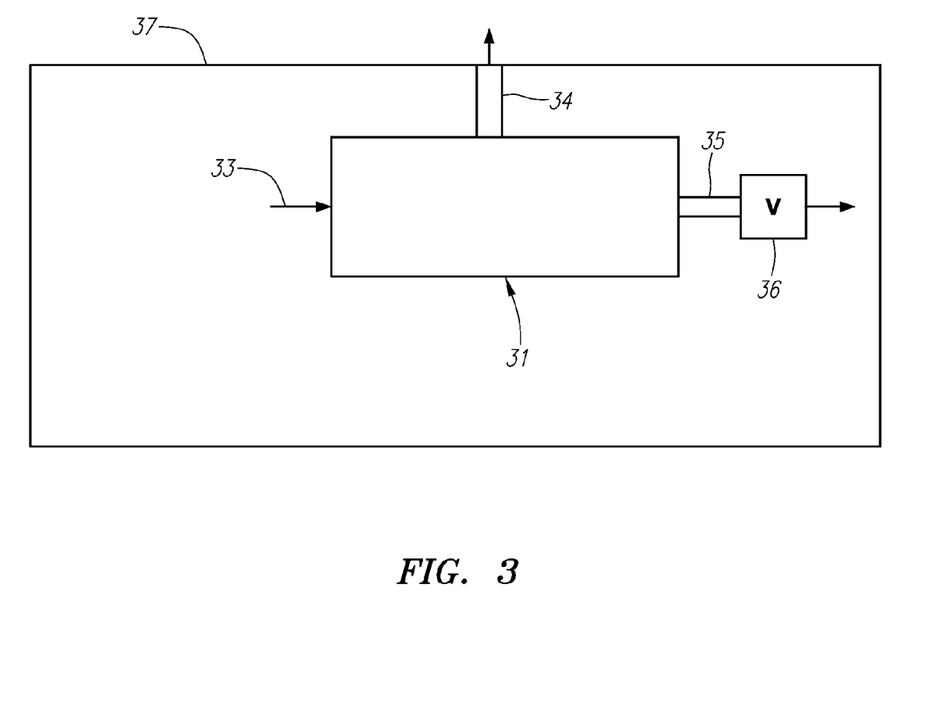
FIG. 3 illustrates an alternate embodiment of the present system for fire protection of a cargo or other compartment on an aircraft, according to one embodiment.

FIG. 3 illustrates a hypoxic fire prevention system for a cargo compartment 37 on an aircraft or other enclosed compartment. An air separation unit 31 utilizes the pressure difference between inlet 33 and oxygen-enriched outlet 34 exposed to the outside. However, in this case, suction must be provided on the hypoxic outlet 35, which is perfectly achievable by attaching a vacuum pump 36.

The same embodiment can be used with an additional compressed air supply, via 3-way valve 29, similar to that depicted in FIG. 2.

A preferable air separation device for the unit 11, 21 and 31 is a hollow fiber membrane with a large surface capable working on a minimal pressure difference between the inlet and outlets. PSA (pressures swing adsorption), VPSA (vacuum pressure swing adsorption) and other air separation techniques and their combinations can be used as well.

Oxygen-enriched byproduct can be used for improving fuel burning process in the aircraft engines and/or for power generation using fuel cells or other power generation techniques.

The air separation device 11, 21 and 31 can also employ an electric current or electro-chemical separation technology, such as modified fuel cell, etc. In this case a fuel cell needs to be redesigned to accommodate an inlet (13, 23, 33) and first (15, 25, 35) and second (14, 24, 34) outlets. Cabin air can be delivered to such a modified fuel cell (11, 21, 31) via this inlet, some oxygen can be used in the electro-chemical process creating electric energy, and oxygen-depleted air can be supplied into a fuel tank or cargo compartment (12, 22 or 37) via first outlet (15, 25, 35). The second outlet (14, 24 and 34) can be used to remove byproducts of oxygen consummation and to provide sufficient suction on the inlet (13, 23, 33). The air movement through the system is supported by the pressure differences between the inlet and outlets.

Second outlet (14, 24 and 34) can be communicating directly to the outside of an aircraft or in any internal space of it that communicates with the outside atmosphere (wheel bay, etc.).

The oxygen content in the oxygen depleted gas mixture transmitted through outlet 15, 25 and 35 can be measured by an in-line oxygen monitor (not shown here) and data transmitted to a computerized controller for possible regulation.

What is claimed is:

1. A system for providing fire prevention for a fuel tank on an aircraft by using cabin air for producing oxygen-depleted (hypoxic) air from the cabin air, said system comprising:
   an air-separation device having an inlet and first and second outlets;
   said air-separation device employing a first pressure difference between said inlet and said first outlet, and a second pressure difference between said inlet and said second outlet;
   said first pressure difference and said second pressure difference providing a driving force for separating said cabin air into oxygen-enriched and oxygen-depleted gas mixtures without preliminary compression;
   said inlet communicating with an interior atmosphere of the aircraft, said first outlet communicating with one of a fuel tank or a cargo compartment, and said second outlet communicating with the atmosphere outside of the said aircraft;
   said inlet receiving said cabin air and said first outlet transmitting an oxygen-reduced gas mixture and said second outlet transmitting an oxygen-enriched gas mixture;
   said oxygen-enriched gas mixture being normally vented outside the aircraft; and
   said oxygen-reduced gas mixture, when in use, being supplied into said fuel tank for maintaining therein a hypoxic environment in order to prevent fuel ignition or explosion;
   wherein an oxygen content in said oxygen-reduced gas mixture is maintained in a range from 9% to 15%.

2. The system according to claim 1, wherein said oxygen-reduced gas mixture, when in use, is constantly supplied into said fuel tank or cargo compartment for maintaining therein a hypoxic environment in order to prevent fuel ignition or explosion.

3. The system according to claim 1, further comprising:
   said air separation device employing a hollow fiber air separation membrane.

4. The system according to claim 1, further comprising:
   said air separation device employing one of fuel cell technology, a PSA technology, or a VPSA technology.

5. The system according to claim 1, further comprising:
   said air separation device employing a combination of membrane and one of VPSA technology or PSA technology.

6. The system according to claim 1, further comprising:
   said inlet of the air separation device being provided with a compressed air when the aircraft is on the ground or at an altitude below 3 km above sea level, in order to provide continuous fire protection.

7. The system of claim 1, further comprising:
   said first outlet being provided with a vacuum pump.

8. The system of claim 1, further comprising:
   said first outlet communicating with a compartment onboard of the aircraft for providing fire protection.

9. The system of claim 1, further comprising:
   said inlet being provided with an additional fan for oxygen content regulation.

10. The system of claim 1, further comprising:
    an oxygen content monitoring system provided for measuring the oxygen content of the oxygen-reduced gas mixture transmitted via said first outlet; and
    a computerized controller for receiving and analyzing data from said oxygen content monitoring system.

11. A method for providing fire prevention for a fuel tank on an aircraft by using cabin air for producing oxygen-depleted (hypoxic) air from said cabin air, said method comprising:
    employing a first pressure difference, by an air-separation device having an inlet and first and second outlets, between said inlet and said first outlet,
    employing a second pressure difference by the air-separation device between said inlet and said second outlet;
    receiving said cabin air by said inlet;
    separating said cabin air, by using said first pressure difference and said second pressure difference as a driving force, without preliminary compression, into oxygen-enriched and oxygen-depleted gas mixtures;

said inlet communicating with an interior atmosphere of the aircraft, said first outlet communicating with one of a fuel tank or a cargo compartment, and said second outlet communicating with the atmosphere outside of the said aircraft;

transmitting by said first outlet an oxygen-reduced gas mixture; and transmitting by said second outlet an oxygen-enriched gas mixture;

said oxygen-enriched gas mixture being normally vented outside the aircraft;

said oxygen-reduced gas mixture, when in use, being supplied into said fuel tank or cargo compartment for maintaining there a hypoxic environment in order to prevent fuel ignition or explosion;

wherein the oxygen content in said oxygen-reduced gas mixture is maintained in the range from 9% to 15%.

12. An apparatus for producing hypoxic air, said apparatus comprising:

an air-separation device having an inlet and first and second outlets;

said air-separation device employing a first pressure difference between said inlet and said first outlet, and a second pressure difference between said inlet and said second outlet;

said first pressure difference and said second pressure difference providing a driving force for separating said cabin air into oxygen-enriched and oxygen-depleted gas mixtures without preliminary compression;

said inlet communicating with an interior atmosphere of the aircraft, said first outlet communicating with one of a fuel tank or a cargo compartment, and said second outlet communicating with the atmosphere outside of the said aircraft;

said inlet receiving said cabin air and said first outlet transmitting an oxygen-reduced gas mixture and said second outlet transmitting an oxygen-enriched gas mixture;

said oxygen-enriched gas mixture being normally vented outside the aircraft; and said oxygen-reduced gas mixture, when in use, being constantly supplied into said fuel tank or cargo compartment for maintaining therein a hypoxic environment in order to prevent fuel ignition or explosion;

wherein an oxygen content in said oxygen-reduced gas mixture is maintained in a range from 9% to 15%.

13. A method of producing hypoxic air for fuel tank or cargo compartment fire prevention on an aircraft, said method comprising:

extracting, by an air separation device according to claim 12, hypoxic air out of air contained in an interior compartment of an aircraft without preliminary pressurization of the air;

supplying said hypoxic air into said fuel tank or cargo compartment and creating there a fire preventative atmosphere; and expelling an oxygen-enriched fraction of the air as a byproduct of the air separation into an atmosphere outside of said aircraft.

14. The method of claim 13, wherein a vacuum pump is provided at said first outlet for improved performance and oxygen content regulation.

15. The method of claim 13, wherein an additional fan is provided on said inlet for improving performance of the system and oxygen content regulation.

16. The method of claim 13, further comprising:

wherein during a flight at altitudes above 3 km above sea level, said inlet receiving cabin air without preliminary pressurization and separating it into oxygen enriched fraction and oxygen reduced fraction;

said oxygen reduced fraction being provided into said fuel tank or cargo compartment, via said first outlet, for fire prevention and said oxygen enriched fraction being expelled into atmosphere outside of said aircraft, via said second outlet;

said inlet having upstream a valve that switches from a non-pressurized cabin air supply to a pressurized air supply;

a compressor that can supply said air separation device, via said valve, with compressed air when aircraft is on the ground or at an altitude below 3 km above sea level;

said valve closing compressed air supply when aircraft reaches an altitude high enough to provide air separation using pressure difference between cabin air and outside atmosphere and using suction provided by the fuel consumption in said fuel tank.

17. An apparatus for producing hypoxic air, said apparatus comprising:

an oxygen-consuming device having an inlet and first and second outlets;

said oxygen-consuming device employing a first pressure difference between said inlet and said first outlet, and a second pressure difference between said inlet and said second outlet;

said first pressure difference and said second pressure difference providing a driving force for moving said cabin air through said oxygen-consuming device and converting said cabin air into oxygen-depleted gas mixture without preliminary compression;

said inlet communicating with an interior atmosphere of the aircraft, said first outlet communicating with one of a fuel tank or a cargo compartment, and said second outlet communicating with the atmosphere outside of the said aircraft;

said inlet receiving said cabin air and said first outlet transmitting an oxygen-reduced gas mixture and said second outlet transmitting byproducts of the oxygen consummation;

said byproducts being normally vented outside the aircraft; and said oxygen-reduced gas mixture, when in use, being constantly supplied into said fuel tank or cargo compartment for maintaining therein a hypoxic environment in order to prevent fuel ignition or explosion;

wherein an oxygen content in said oxygen-reduced gas mixture is maintained in a range from 9% to 15%.

18. A method of producing hypoxic air for fuel tank fire prevention on an aircraft, said method comprising:

extracting, by an oxygen-consuming device according to claim 17, oxygen out of air contained in an interior compartment of an aircraft without preliminary pressurization of the air and producing this way a hypoxic air;

supplying said hypoxic air into said fuel tank and creating there a fire preventative atmosphere; and expelling a byproduct of the oxygen consummation into an atmosphere outside of said aircraft.

19. The method of claim 18, wherein a vacuum pump is provided at said first outlet for improved performance and oxygen content regulation.

20. The method of claim 18, wherein
an additional fan is provided on said inlet for improving performance of the system and oxygen content regulation.

* * * * *